(12) United States Patent  
Allred et al.

(10) Patent No.: US 8,413,398 B1  
(45) Date of Patent: Apr. 9, 2013

(54) BALL PIVOT ASSEMBLIES AND SYSTEMS AND METHODS INCORPORATING THE SAME

(75) Inventors: Charles B. Allred, Bountiful, UT (US); Brian Hillstrom, Loretto, MN (US); Guillaume Martin, Villecresnes (FR); Jeremy Porter, Salt Lake City, UT (US)

(73) Assignee: 3form, Inc., Salt Lake City, UT (US)

( * ) Notice: Subject to any disclaimer, the term of this patent is extended or adjusted under 35 U.S.C. 154(b) by 312 days.

(21) Appl. No.: 12/488,214

(22) Filed: Jun. 19, 2009

Related U.S. Application Data

(60) Provisional application No. 61/074,419, filed on Jun. 20, 2008.

(51) Int. Cl.
| | |
|---|---|
| *E04B 7/00* | (2006.01) |
| *E04B 9/00* | (2006.01) |
| *E04B 2/00* | (2006.01) |
| *E04B 1/38* | (2006.01) |
| *G09F 7/18* | (2006.01) |
| *A47G 1/24* | (2006.01) |
| *A47F 5/00* | (2006.01) |
| *F16M 11/02* | (2006.01) |
| *F16B 9/00* | (2006.01) |
| *F16D 3/00* | (2006.01) |

(52) U.S. Cl. ............ 52/506.06; 52/22; 52/39; 52/126.1; 52/506.05; 52/506.08; 52/511; 248/481; 248/482; 248/483; 248/484; 248/288.31; 248/181.1; 403/70; 403/71; 403/76

(58) Field of Classification Search ............... 52/22, 39, 52/126.1, 220.6, 506.08, 506.06, 506.05, 52/511, 220.8, 704–711; 248/481–484, 288.31, 248/181.1; 403/122–144, 70, 71, 76; 16/2.1, 16/224; 384/206, 192
See application file for complete search history.

(56) References Cited

U.S. PATENT DOCUMENTS

| | | | | |
|---|---|---|---|---|
| 2,988,633 | A | * | 6/1961 | Rosenfield .................. 362/219 |
| 4,157,876 | A | * | 6/1979 | DiGiulio ........................ 403/90 |
| 4,261,607 | A | * | 4/1981 | Pilcher ......................... 294/182 |
| 4,438,612 | A | * | 3/1984 | Bernard et al. ................. 52/427 |

(Continued)

OTHER PUBLICATIONS

Product Illustration—Part No. 15-BS-1420, Griplock Systems, Carpinteria, California, dated Sep. 21, 2007.

(Continued)

*Primary Examiner* — Brian Glessner  
*Assistant Examiner* — Omar Hijaz  
(74) *Attorney, Agent, or Firm* — Workman Nydegger (57) ABSTRACT

Ball pivot assemblies for mounting panels to a cable regardless of panel geometry or orientation include a ball pivot. The ball pivot includes geometry configured to enable a panel to pivot about the ball pivot in a plurality of orientations in a plurality of planes with respect to the cable. One or more implementations of the present invention can include a ball socket configured to receive the ball pivot, and provide a secure interface between the ball pivot assembly and the panel. Also, systems of at least one implementation of the present invention include a plurality of panels mounted to one or more cables using one or more ball pivot assemblies. In addition, one or more implementations of the present invention include methods of mounting panels using one or more ball pivot assemblies.

20 Claims, 5 Drawing Sheets

U.S. PATENT DOCUMENTS

| | | | | |
|---|---|---|---|---|
| 4,974,802 A * | 12/1990 | Hendren | ............... | 248/181.1 |
| 5,058,847 A * | 10/1991 | Arakawa | ............... | 248/328 |
| 5,071,279 A * | 12/1991 | Rutstrom | ............... | 403/90 |
| 5,489,074 A * | 2/1996 | Arnold et al. | ............... | 244/159.1 |
| 5,755,526 A * | 5/1998 | Stanevich | ............... | 403/122 |
| 5,921,698 A * | 7/1999 | Hegen et al. | ............... | 403/263 |
| 7,100,881 B2 * | 9/2006 | Worrall | ............... | 248/278.1 |
| 7,476,050 B2 * | 1/2009 | Ditzler | ............... | 403/39 |
| 7,534,965 B1 * | 5/2009 | Thompson | ............... | 174/153 G |
| 7,658,046 B2 * | 2/2010 | Lynch et al. | ............... | 52/506.07 |

OTHER PUBLICATIONS

Product Illustration—Part No. 12-K12, Griplock Systems, Carpinteria, California, dated Dec. 27, 2004.

"How It Works, Technical & Quality Control," Author Unknown, Copyright 2007 Griplock Systems, Carpinteria, California, pp. 1-7 [online] [retrieved on Jul. 29, 2009]. Retrieved from the Internet: http://www.griplocksystems.com/technicallegal/technical.cfm#howItWorks.

* cited by examiner

BALL PIVOT ASSEMBLIES AND SYSTEMS AND METHODS INCORPORATING THE SAME

CROSS-REFERENCE TO RELATED APPLICATIONS

The present invention claims the benefit of priority to U.S. Provisional Application No. 61/074,419, filed Jun. 20, 2008, entitled "Ball Pivot Assemblies, Panel Mounting Systems, and Methods," the entire content of which is incorporated by reference herein.

BACKGROUND OF THE INVENTION

1. The Field of the Invention

This invention relates to systems, methods, and apparatus for mounting and/or displaying panels as partitions, displays, barriers, treatments, or other structure.

2. Background and Relevant Art

Some recent architectural designs have implemented synthetic, polymeric resins, which may be used as partitions, displays, barriers, or treatments etc. In general, resin materials are now popular compared with decorative cast or laminated glass materials, since resin materials may be manufactured to be more resilient and to have a similar transparent, translucent, or colored appearance as cast or laminated glass, but with less cost. Decorative resins may also provide more flexibility compared with glass at least in terms of color, degree of texture, gauge, and impact resistance. Furthermore, decorative resins have a fairly wide utility since they may be formed to include a large variety of artistic colors, images, and shapes. For example, resin materials can be formed in flat or three-dimensional (i.e., curved) formations, such as with compound curvatures. As a result, these and other similar types of panel materials have a fairly wide functional and aesthetic utility, and can be used to readily change the design and function of new and existing structures.

As mentioned above, one particular use of decorative resins can be in the panel form, where the panel might be used in conjunction with a panel mounting system as part of a partition, display, barrier, or treatment. One conventional type of panel mounting system includes mounting panels to cables suspended between support surfaces or from a ceiling. For example, a manufacturer may use brackets to secure each panel to a suspended cable.

Unfortunately, conventional panel mounting systems such as these tend to suffer from a number of drawbacks. For example, conventional mounting hardware is often only configured to be used with planar panels, and often does not account for the variable and curved surfaces of more complex panels. Also, conventional mounting hardware is configured to secure planar panels in upright or horizontal positions. Thus, when used with curved or angled panels, the mounting interface created by the hardware may tend to dig into or otherwise damage the panel. Indeed, when conventional hardware is used to mount curved or angled panels, the hardware often contacts the panel at undesired orientations that causes stresses to concentrate in areas or points of the resin panel, which may eventually cause the panel to crack.

Furthermore, conventional mounting hardware is typically inflexible, allowing panels to be mounted in a limited number of orientations and configurations. The few conventional mounting hardware options that can be used to secure panels in angled positions typically require complicated installation processes and do not allow easily or quick assembly, disassembly, or reconfiguration. Thus, conventional systems and methods for mounting panels, particularly curved or angled panels, do not generally provide much flexibility in terms of mounting style or arrangement without relatively complicated hardware and installation processes.

Furthermore, conventional mounting hardware often is unsightly, too noticeable, or does not provide an appropriate aesthetic for desired design environments. The unpleasant aesthetic of conventional mounting hardware is often magnified when used with translucent or other panels that magnify texture, light, color, and/or form. Thus, conventional mounting hardware may be unappealing to designers and architects seeking to create a certain aesthetic by using resin panels.

Furthermore, conventional mounting hardware often does not account for the material properties of the particular type of panel being used; and thus, can lead to panel damage. For instance, conventional mounting hardware may not account for the unique material properties of resin panels. In particular, resin panels may undergo significantly greater thermal expansion than metal or other conventional types of panels. Hardware that is too loose due to retraction of a panel can result in inappropriate shifting of the panel, which may cause the panel to rest in unintended positions against hardware. Similarly, hardware that is too tight due to the expansion of a panel may result in one or more of the components digging into the panel, which can result in the creation of point stress that can lead to cracks and other damage.

Accordingly, there are a number of disadvantages in conventional panel mounting systems that can be addressed.

BRIEF SUMMARY OF THE INVENTION

Implementations of the present invention provide systems, methods, and apparatus for mounting panels as partitions, displays, barriers, treatments, or other structures with a great deal of functional versatility. In particular, implementations of the present invention provide mounting systems and components for mounting panels to cables suspended from or between one or more mounting surfaces. For example, one or more implementations of the present invention include systems and components that enable panels to be secured to cables almost regardless of the geometry of the panel or the panel's angle or orientation relative to the cable. Furthermore, these systems and components enable panels to be quickly and efficiently assembled, disassembled, and reconfigured with great ease. Accordingly, implementations of the present invention can be easily adapted to the environment of use and provide a number of secure mounting options.

For example, one implementation of a panel mounting system can include at least one cable configured to be secured to a support structure. The panel mounting system can also include at least one panel having at least one recess formed therein. The at least one recess can be configured to receive the at least one cable. The panel mounting system can further include at least one substantially spherical ball pivot having a mounting channel extending axially from the ball pivot. The mounting channel can be configured to receive and secure the at least one cable therein. Furthermore, the at least one ball pivot can be configured to be received in the at least one recess of the at least one panel and secure the at least one panel in a plurality of different orientations relative to the at least one cable.

Additionally, an implementation of a ball pivot for securing an object, such as a decorative architectural resin panel, to a cable suspended from a support structure in a plurality of different orientations relative to the cable can include a substantially spherical body. The ball pivot can also include a mounting channel that is sized and configured to receive a cable therein. The mounting channel can extend axially through the center of the spherical body. The ball pivot can further include a locking channel extending from the outer surface of the body into the mounting channel, and a locking mechanism configured to engage the locking channel and secure a cable within the mounting channel.

Also, an implementation of a ball socket for use in securing a curved or angled object, such as a decorative architectural resin panel, to a suspended cable can include a body having a first end, an opposing second end, and a length extending therebetween. The body can define an inner chamber configured to at least partially surround a ball pivot. The ball socket can also include a flange extending radially outward from the first end of the body. The ball socket can additionally include a lip extending radially from the second end of the body partially into the inner chamber. The lip can be configured to prevent a ball pivot from passing out of the inner chamber through the second end of the body.

Furthermore, an implementation of a ball pivot assembly for securing a panel to a suspended cable can include a substantially spherical ball pivot having a mounting channel extending axially through the ball pivot. The mounting channel can be configured to allow a cable to pass therethrough. The ball pivot assembly can also include a ball socket having an inner chamber configured to receive at least a portion of the ball pivot. The ball pivot assembly can allow the ball socket to pivot about the ball pivot between a plurality of orientations in a plurality of planes. The ball socket can further include a flange extending radially outward from a first end of the ball socket, and a lip extending radially from a second end of the ball socket partially into the inner chamber.

In addition to the foregoing, an implementation of a method of securing a curved or angled object, such as a decorative architectural resin panel, to a suspended cable can involve passing a cable at least partially through a through-hole formed in a panel. The method can also involve inserting the cable within a mounting channel of a substantially spherical ball pivot and locking the ball pivot in place along the cable. Additionally, the method can involve placing the ball pivot at least partially within the through-hole of the panel whereby the ball pivot supports at least a portion of the weight of the panel. Furthermore, the method can also involve pivoting the panel about the ball pivot to position the panel in a desired position.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale and that elements of similar structure or function are generally represented by like reference numerals for illustrative purposes throughout the drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention provide systems, methods, and apparatus for mounting panels as partitions, displays, barriers, treatments, or other structures with a great deal of functional versatility. In particular, implementations of the present invention provide mounting systems and components for mounting panels to cables suspended from or between one or more mounting surfaces. For example, one or more implementations of the present invention include systems and components that enable panels to be secured to cables almost regardless of the geometry of the panel or the panel's angle or orientation relative to the cable. Furthermore, these systems and components enable panels to be quickly and efficiently assembled, disassembled, and reconfigured with great ease. Accordingly, implementations of the present invention can be easily adapted to the environment of use and provide a number of secure mounting options.

Additionally, one will appreciate from the description provided herein that the systems and components of the present invention can also help prevent panel damage by accounting for one or more unique material properties of resin panels. For instance, one or more components of the present invention can accommodate for the expansion and contraction in response to temperature changes of the panels with which they are used. Thus, one or more components of the present invention can reduce panel damage by helping to prevent or otherwise accommodate over-tightening and loosening of panel mounting hardware. Along these lines, one or more components of the present invention can provide a flexible/resilient barrier between softer resin panels and harder mounting components, which can reduce the likelihood of panel damage.

Furthermore implementations of the present invention can provide systems, methods, and apparatus for mounting panels as partitions, displays, barriers, treatments, or other structure with a great deal of aesthetic versatility. For example, implementations of the present invention include hardware components that not only allow for the mounting of complex-shaped panels and angled panels, but also are configured to reduce the visibility of or at least partially hide hardware components. In particular, one or more implementations of the present invention can include hardware mounting components that are securable within a panel to reduce visibility, and include unique shapes which provide a desirable aesthetic. Accordingly, a user can easily configure implementations of the present invention for securely mounting angled, curved, or complex-shaped panels with a reduced likelihood of damage, while also providing a pleasing aesthetic.

As mentioned above, architects, designers, and assemblers may particularly choose to use the components of the present invention to mount resin panels because one or more components of the present invention can help reduce the likelihood of damaging the resin panels, while also providing a please aesthetic. As used herein, the terms "resin panel" and "resin-based panel" refer to panels comprising a substrate of one or more layers or sheets formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like.

As a preliminary matter, implementations of the present invention are described herein primarily with reference to mounting resin panels. One will appreciate, however, that a panel, particularly a resin-based panel, is only one type of "object" that the ball pivot assemblies described herein can secure. For example, the ball pivot assemblies of the present invention mount not only resin "panels," as such, but also glass or other types of panels, to a given support structure. Furthermore, one will appreciate that the mounting hardware, systems, and methods of the present invention can also mount other types of structures having different material compositions, such as objects comprising wood, stone, fiberglass, or the like, which may or may not exhibit primarily panel-like dimensions as described herein. Reference herein, therefore, to panels, or even resin panels, as such, is primarily for convenience in description.

Figure 1A:
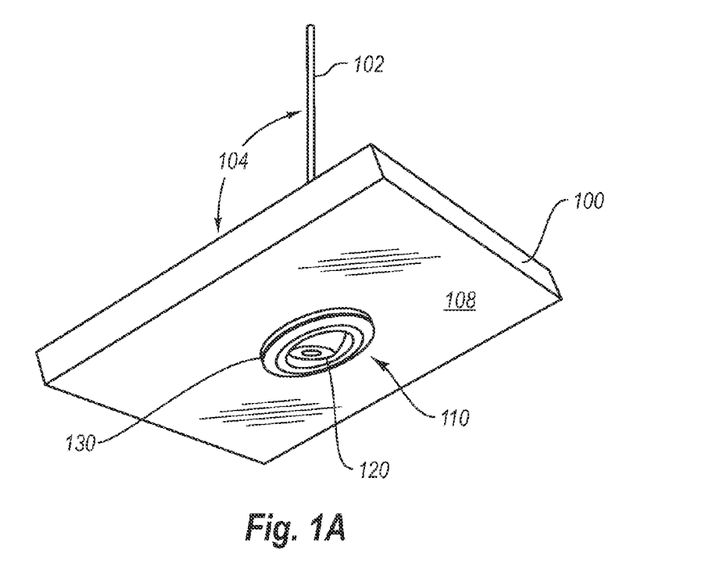
FIG. 1A illustrates a perspective-view of an angled panel mounted to a suspension cable via a ball pivot assembly in accordance with an implementation of the present invention.
Figure 1B:
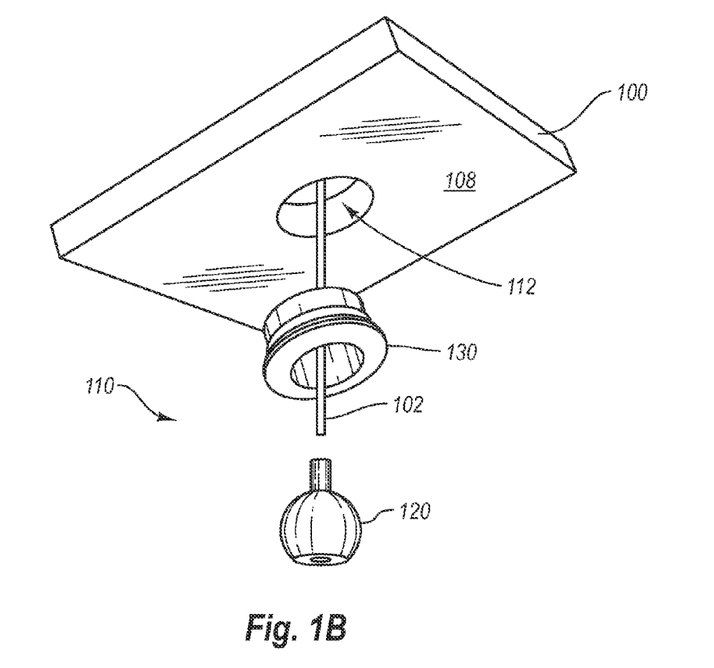
FIG. 1B illustrates an exploded, perspective-view of the panel and ball pivot assembly of FIG. 1B.

Referring now to the Figures, FIGS. 1A-1B illustrate an assembled, perspective view and an exploded, perspective view, respectively, of a panel 100 mounted to a suspended cable 102 via a ball-pivot assembly 110 in accordance with an implementation of the present invention. As mentioned-above, and as described in greater detail below, the ball-pivot assembly 110 can allow a user (e.g., a manufacturer, assembler, engineer, designer, architect) to securely mount the panel 100 to a suspended cable 102, regardless of whether the panel 100 is curved, has a complex geometry, or is angled relative to the cable 102. The ball-pivot assembly 110 can securely mount both curved panels and angled panels to a suspended cable 102, while also ensuring that mounting components engage the panels along desired interfaces, and do not dig into or otherwise stress or damage the panels.

According to at least one implementation of the present invention, the ball-pivot assembly 110 can include a ball pivot that attaches to a cable and holds the weight of a panel. For example, FIGS. 1A-1B illustrate that the ball-pivot assembly 110 can include a ball pivot 120. As explained in greater detail below, the ball pivot 120 can have a substantially spherical shape and include a cable-grip mechanism for locking or fixing the ball pivot 120 at a desired position along the cable 102.

Additionally, according to at least another implementation of the present invention, the ball-pivot assembly 110 can also include a ball socket 130. The ball socket 130 can at least partially surround the ball pivot 120, and can provide a mounting interface between the panel 100 and the ball-pivot assembly 110. Also, as explained in greater detail below, the ball socket 130 can include various features and components configured to prevent—or at least minimize—damage to the panel 100 by providing a secure interface with the panel 100.

As shown in FIGS. 1A-1B, a user can secure the ball socket 130 within a through-hole 112 of the panel 100. In particular, the user can position the ball socket 130 against a first surface 108 of the panel 100. The user can then secure the ball pivot 120 in a desired position along the cable 102. Once the ball pivot 120 is securely fastened to the cable 102, the user can position the ball socket 130 over the ball pivot 120, so that the ball socket at least partially receives the ball pivot 120 therein. Once within the ball socket 130, the ball pivot 120 can support the weight of the panel 100.

Furthermore, the ball socket 130, and therefore the panel 100, can freely rotate, swivel, and pivot about the ball pivot 120. The ability of the ball socket 130 to freely pivot about the ball pivot 120 allows the ball socket 130 to adjust to the angle of the panel 100 relative to the cable 102. One will appreciate in light of the disclosure herein that a user can position the ball socket 130 and the panel 100 about the ball pivot 120 in a plurality of positions in a plurality of planes. For example, FIGS. 1A-1B illustrate that a user has pivoted the ball socket 130 about the ball pivot 120 to orient the panel 100 at an angle 104 relative to the cable 102.

The ability of the ball socket 130 to freely pivot about the ball pivot 120 can allow a user to change the orientation of the panel 100 relative to the cable 102 without having to add or remove hardware or fasteners. Thus, the ball pivot assembly 110 can provide a user with substantial freedom to reconfigure and experiment with various panel orientations to create the proper layout and aesthetic the user desires. Since a user can orient the panels without having to disconnect the panels from the cable, the user can quickly experiment with different configurations to create a new aesthetic or quickly adjust a current configuration when changing the use of an area. In addition, a user can reconfigure portions of a panel since the panel can be partially supported by ball pivot assemblies 110 on one or more ends of the panel 100. This can allow the user to pivot the opposite end of the panel 100 to a new location or orientation.

Figure 2:
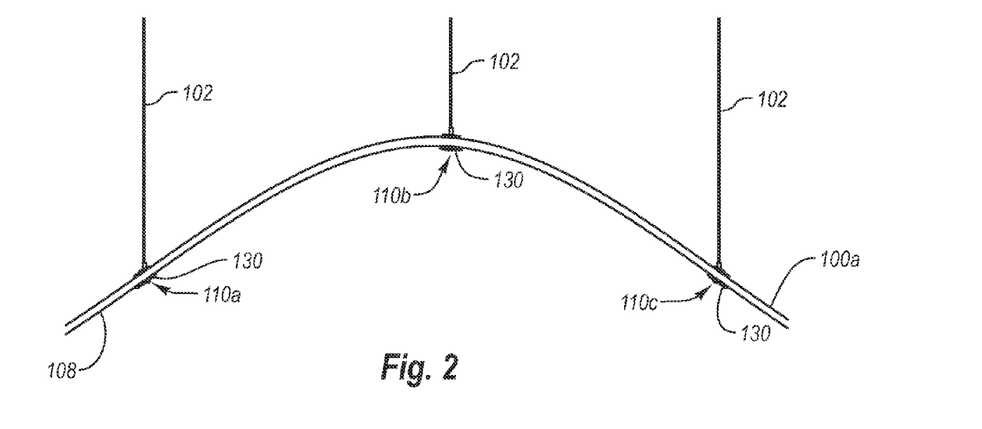
FIG. 2 illustrates a side view of a curved panel suspended from a support surface via a plurality of ball pivot assemblies in accordance with an implementation of the present invention.

In addition to accommodating for various panel orientations relative to a suspended cable 102, the ability of the ball socket 130 to freely pivot about the ball pivot 120 can accommodate for various panel shapes and geometries, whether they are curved, otherwise non-planar, or planar. For example, FIG. 2 illustrates a panel 100a with a curved shape mounted to a plurality of suspension cables 102 via three ball pivot assemblies 110a-c. As shown in FIG. 2, each of the ball sockets has pivoted about the respective ball pivot to accommodate for the various curvature of the panel 100a.

Additionally, because the ball socket 130 is independent of—and can pivot about—the ball pivot 120, the interface between the ball pivot assembly 110 and the panel 100 can remain constant notwithstanding the curvature of the panel 100 or the orientation of the panel 100 relative to the cable 102. For example, both FIGS. 1A and 2 illustrate that the flanges respective ball sockets 130 are positioned squarely against the viewable surface 108 of the respective panel 100.

This is despite the angle of orientation of panel 100 of FIG. 1A and the curvature of panel 100a of FIG. 2. Thus, the ball pivot assembly 110 can help ensure that the interface between the panel 100 and the ball socket 130 is such that stresses and potential panel damage are minimized, while also securely mounting a curved or angled panel to the cable 102.

One will appreciate in light of the disclosure herein, that in addition to helping prevent panel damage, the ball pivot assemblies 110 of the present invention can also help reduce the visibility of mounting hardware, and thus, help magnify the aesthetic properties of a given panel or panel system. For example, as mentioned previously and as shown in FIGS. 1A-2, a user can position the ball pivot 120 and ball socket 130 within a through-hole 112 of a panel 100. Because the ball socket 130 is secured within the panel, at least a portion of the ball socket 130 may be hidden from view. Thus, the engagement between the ball socket 130 and the panel 100 can reduce the visibility of the ball pivot assembly 110.

In addition to the ability to conceal portions of the ball pivot 120 and ball socket 130 within a panel, the components of the ball pivot assembly 110 can have a color and transparency to further reduce their visibility. For example, in at least one implementation of the present invention, the transparency and color of the ball socket 130 can correspond to the transparency and color of the panel 100 with which it is used. Thus, the ball socket 130 can blend in with the panel 100 to reduce its visibility. In one or more implementations, the color and/or transparency of ball socket 130 and other components of the ball pivot assembly 110 can differ from that of the panel 100 in order to provide a desired aesthetic.

Figure 3:
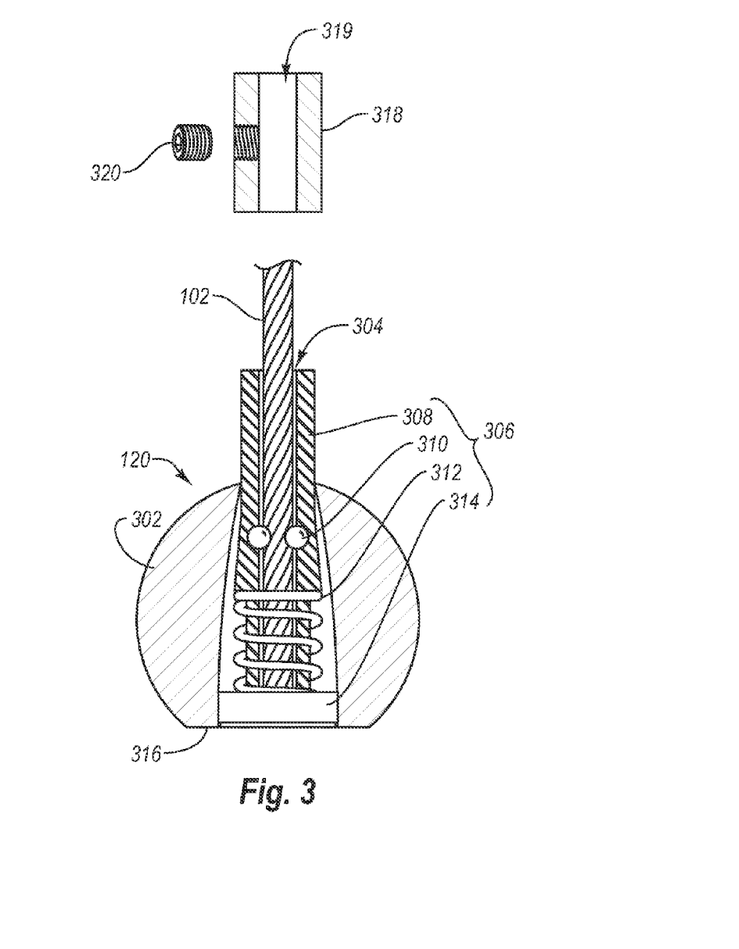
FIG. 3 illustrates a cross-sectional view of a ball pivot of the ball pivot assembly of FIG. 1A and a plunger cap in accordance with an implementation of the present invention.
Figure 4:
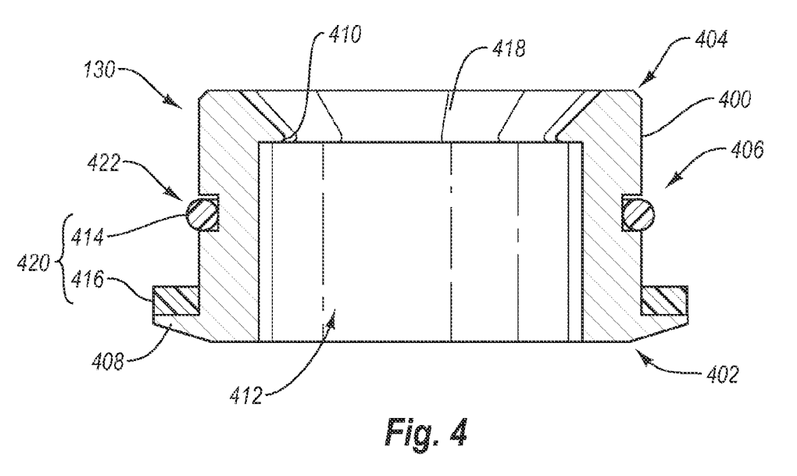
FIG. 4 illustrates a cross-sectional view of a ball socket of the ball pivot assembly of FIG. 1A.

FIGS. 3 and 4 and the corresponding text, illustrate or describe a number of components, details, and features of the ball pivot assembly 110 shown in FIGS. 1A-2. In particular, FIG. 3 illustrates a side, cross-sectional view of the ball pivot 120 and FIG. 4 illustrates a side, cross-sectional view of the ball socket 130. As an initial matter, each of the ball pivot 120 and the ball socket 130 can be formed from a strong, lightweight material. For instance, according to at least one implementation of the present invention, the ball pivot 120 and the ball socket 130 can each be formed from a metal or alloy thereof, such as for example, aluminum or stainless steel. One will appreciate, however, that these and other components described herein can be prepared from any number of metallic materials, synthetic or naturally occurring resins, rubbers, glass, and/or composites thereof.

Referring now to FIG. 3, according to at least one implementation of the present invention, the ball pivot 120 can have a substantially spherical shape. The spherical shape of the ball pivot 120 can allow a panel or intermediate hardware (e.g., a ball socket) to pivot about the ball pivot 120, as discussed above. Additionally, the curvature of the ball pivot 120 can help prevent the creation of point stresses, which may lead to panel damage.

As illustrated in FIG. 3, according to some implementations of the present invention, the ball pivot 120 can include a body 302 having a substantially spherical shape with a flattened bottom surface 316. The flattened bottom surface 316 can reduce the amount of the ball pivot 120 that extends out of the ball socket 130 (FIG. 1A), and thus, reduce the visibility of the ball pivot assembly 110.

The ball pivot 120 can also include a mounting channel configured to receive a suspended cable. For example, FIG. 2 illustrates that the body 302 of the ball pivot 120 can include a mounting channel 304 extending axially there through. In other words, the mounting channel 304 can extend from one end of the ball pivot 120, along the central axis of the ball pivot 120, and out the opposing end of the ball pivot 120. The positioning of the mounting channel 304 along the central axis of the ball pivot 120 can help ensure that the ball pivot 102 and any corresponding panels are balanced relative to the cable 102. This can help prevent various components of the ball pivot assembly 110 from contacting a panel at undesired orientations, digging into the panel, or otherwise damaging the panel.

The ball pivot 120 can also include a cable-grip mechanism for securing the ball pivot 120 to the cable 102, or in other words for securing the cable 102 within the mounting channel 304 of the ball pivot 120. For example, FIG. 3 illustrates that the ball pivot 102 can include a spring-loaded cable-grip mechanism 306. The spring-loaded cable-grip mechanism 306 can comprise a shaft or plunger 308, one or more gripper elements 310, a spring 312, and a pressure plate 314.

When the spring-loaded cable-grip mechanism 306 is in the static position shown in FIG. 3, or in other words with the plunger 308 is not depressed within the body 302, the spring 312 and plunger 308 can bias the one or more gripper elements 310 against the cable 102 and lock the ball pivot 120 to the cable 102. To disengage the spring-loaded cable-grip mechanism 306, a user can depress the plunger 308 at least partially within the body 302 of the ball pivot 120, which releases the one or more gripper elements 310 and allows the cable 102 to pass freely within the mounting channel 304.

According to some implementations of the present invention when in the static position, the spring-loaded cable-grip mechanism 306 can prevent movement of the ball pivot 120 along the cable 102 in one direction, but allow movement of the ball pivot 120 along the cable 102 in an opposing direction. For example, when in the static position the spring-loaded cable-grip-mechanism 306 can allow the cable 102 to pass through the ball pivot 120 in the direction generally from the plunger 308 toward the pressure plate 314, while preventing the cable 102 from passing through the ball pivot 120 in the direction generally from the pressure plate 314 toward the plunger 308.

Thus, in use a user can insert the cable 102 within the plunger 308, through the body 302 of the ball pivot 120, and out of the pressure plate 314. The user can then slide the ball pivot 120 along the cable 120 to a desired position by passing the cable 102 through the ball pivot 120 in the direction generally from the plunger 308 toward the pressure plate 314. Once in the desired position, the spring-loaded cable-grip mechanism 306 can prevent the ball pivot 120 from moving down the cable 102, or in other words prevent the cable 102 from passing through the ball pivot 120 in the direction generally from the pressure plate 314 toward the plunger 308. This can allow a user to freely change the position of the ball pivot assembly 110 (e.g., FIGS. 1A-1B) and a panel 100 along a suspended cable 102 by moving the ball pivot 120 and the panel 100 up the cable 102. Of course, this can, at the same time, prevent the ball pivot 120 and the panel 100 from sliding down the cable 100.

To remove the ball pivot 120, the user can depress the plunger 308 within the body 302 of the ball pivot 120. This releases the one or more gripper elements 310. Once the one or more gripper elements 310 are released, the user can then slide the ball pivot 120 off of the cable 102 by passing the cable 102 through the ball pivot 120 in the direction generally from the pressure plate 314 toward the plunger 308.

According to at least another implementation of the present invention, the ball-pivot assembly 110 can further include a plunger cap for preventing the inadvertent depression of the plunger 308 and releasing of the ball pivot 120. For example, FIG. 3 illustrates a plunger cap 318 according to an implementation of the present invention. As shown in FIG. 3, the plunger cap 318 can have a cylindrical shape with a central channel 319. To lock the plunger 308 in place, a user can position the plunger 308 within the central channel 319 of the plunger cap 318, and then secure the plunger cap 318 to the plunger 308 via a fastener 320. One will appreciate that the plunger cap 318 can prevent the ball socket 130 or panel 100 from inadvertently depressing the plunger 308 and releasing the ball pivot 120 from the cable 102 during mounting.

One will appreciate in light of the disclosure herein that the implementation of the ball pivot 120 illustrated in FIGS. 1A-3 can provide a user with the ability to quickly and easily secure the ball pivot 120 to a cable 102. This is due at least in part in at least one implementation since no fastener or tooling is required to secure the ball pivot 120 to the cable 102. Thus, a user can quickly and easily mount or dismount the ball pivot 120 to a cable 102 simply by sliding the ball pivot 120 along the cable 102 and/or depressing the plunger 308. Additionally, the spring-loaded cable-grip mechanism 306 can allow a user to quickly reposition the ball pivot 120 along the cable 102. Thus, the ball pivot 120 can provide a user with substantial freedom to spontaneously reconfigure and experiment with the position of the ball pivot 120 to create the layout and aesthetic they desire.

FIG. 4 illustrates additional details of an implementation of a ball socket 130. As shown in FIG. 4, the ball socket 130 can include a body 400 having a first end 402, an opposing second end 404, and a length extending therebetween 406. The body 400 can define an inner chamber 412 configured to at least partially surround and receive a ball pivot. According to some implementations of the present invention, the inner chamber 412 of the ball socket 130 can have curved walls to help allow the ball socket 130 to pivot or rotate about a ball pivot 120. For example, FIG. 4 illustrates an implementation in which the inner chamber 412 has a cylindrical shape.

As shown in FIG. 4, the ball socket can also include a flange 408 extending radially outward from the first end 402 of the body 400. The flange 408 can engage a first surface 108 of the panel 100 (FIG. 1B) to hold the ball socket 130 within a through-hole 112 of a panel 100 (FIG. 1B). In at least one implementation of the present invention, the flange 308 can extend radially outward from the first end 402 of the body 400 to a distance large enough to account for any expansion of the panel (i.e., enlarging of the through-hole 112).

The ball socket 130 can also include a lip 410 extending radially from the second end 404 of the body 400 partially into the inner chamber 412. The lip 410 can prevent a ball pivot positioned within the inner chamber 412 from passing out of the inner chamber 412 through the second end 404 of the body 400. According to some implementations of the present invention, the lip 410 can include a beveled surface 418. One will appreciate in light of the disclosure herein that the beveled surface 418 of the lip 410 can provide increased space to allow greater pivoting of the ball socket 130 about a ball pivot 120 and or cable 102. In particular, according to some implementations of the present invention the ball socket 130 (and thus a panel 100) can pivot up to seventy-five degrees (75°) and rotate three hundred and sixty degrees (360°) relative to a cable 102. According to other implementations of the present invention the ball socket 130 (and thus a panel 100) can pivot up to sixty degrees (60°) and rotate three hundred and sixty degrees (360°) relative to a cable 102. Thus, a user can orient the ball socket 130 (and a corresponding panel 100) in a plurality of positions (determined by the angle of pivot) in plurality of planes (determined by angle of rotation).

The socket 130 can also include various additional features that account for the unique material properties of resin panels and that help reduce the likelihood of the ball socket 130 damaging any panels with which it is used. For example, as shown in FIG. 4, the socket 130 can include one or more barrier members 420. As explained in greater detail below the barrier members 420 can help prevent the harder features of the ball socket 130 from contacting a panel 100 with which it is used.

According to some implementations of the present invention, the barrier members 420 can include a washer. For example FIG. 4, illustrates that a washer 416 can be secured around the body 400 of the ball socket 130, on top of the flange 408. The washer 416 can provide a flexible, cushioning barrier between the harder parts of the socket 130 (e.g., the flange 408) and the softer material of a panel 100. Thus, the washer 416 can help ensure that the ball socket 130 does not scratch a panel 100 during installation and/or disassembly. Additionally, the washer 416 can help ensure that the flange 408 does not dig into—and create point stresses within—the panel 100 that can eventually panel damage.

Additionally, in at least one implementation of the present invention, the barrier member can also include an o-ring. For example, FIG. 4 illustrates that the ball socket 130 can include an o-ring 414 secured within a channel 422 of the body 400 of the ball socket 130. The channel 422, and thus the o-ring 414, can be located approximately midway up the length 406 of the body 400 of the socket 130 to help ensure that the body 400, and particularly an upper end 404 of the body 400, does not dig into or otherwise damage a panel 100. Similar to the washer 416, the o-ring 414 can provide a flexible, cushioning barrier between the harder parts of the ball socket 130 and the softer (or more damageable) material of a panel 100.

The o-ring 414 and the washer 416 can both be formed from polytetrafluoroethylene, rubber, or other suitable material that is light weight, durable, and that can provide a resilient barrier between the ball socket 130 and a panel 100. In one or more implementations, the o-ring 414 and/or the washer 416 can be formed from a material configured with approximately the same or similar coefficient of thermal expansion as the panel 100. Thus, the o-ring 414 and/or washer 416 can expand and contract at approximately the same rate as the panel 100 and thereby help ensure that there is always an adequate barrier between the harder features of the ball socket 130 and a softer panel 100.

As an additional feature to help account for any expansion and contraction of a panel 100, in some implementations of the present invention, the ball socket 130 can be sized and configured so that there is a clearance or gap between the outer surfaces of the body 400 of the ball socket 130 and the through-hole 112 of the panel 100 (FIG. 1B). The clearance between the ball socket 130 and the panel 100 can provide the panel 100 with room to expand. Thus, the clearance can reduce stresses that can be caused by the panel 100 expanding around and squeezing the ball socket 130. Furthermore, the clearance can help make assembly and disassembly of the ball socket 130 easier and quicker.

One will appreciate in light of the disclosure herein that the clearance between the ball socket 130 and the panel 100 is possible at least in part because ball socket 130 can be held within the panel 100 by the force created by the ball pivot 120 pushing the lip 410 which causes the flange 408 to push against the panel 100. Thus, no force between the through-hole 112 (FIG. 1B) of the panel 100 and the body 400 of the ball socket 130 is necessary to hold the ball socket 130 within the panel 100. According to at least one implementation, the size of the clearance between the ball socket 130 and the panel 100 can correspond to approximately the diameter of the o-ring 414.

One will appreciate that the ball pivot 120 shown and described above in relation to FIGS. 1A-3 is only one implementation of a ball pivot contemplated by the present invention. The ball pivot can include other or alternative features and shapes to provide different effects, albeit within the context of the same or similar mounting interface. For example, according to one or more alternative implementations of the present invention, the ball pivot can have an oval-shaped body or other geometry in contrast to the substantially spherical body 302 of the ball pivot 120 shown in FIGS. 1A-3.

Figure 5:
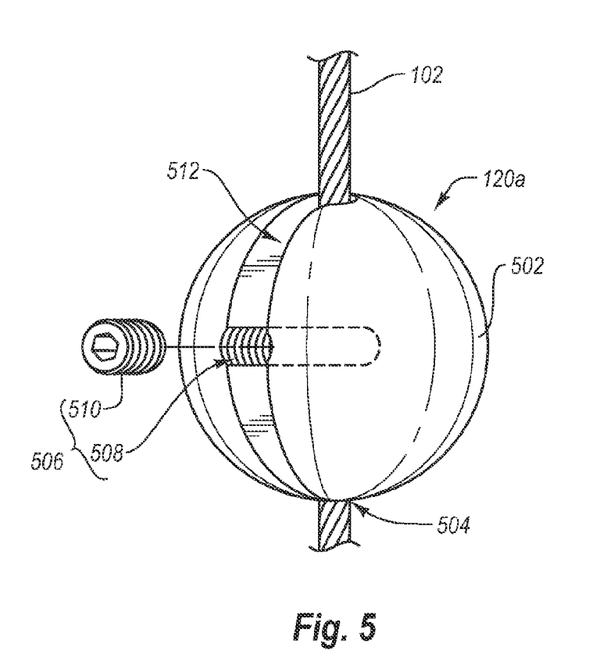
FIG. 5 illustrates a perspective view another ball pivot in accordance with an implementation of the present invention.

Alternatively, as shown in FIG. 5, the ball pivot 120a can have a spherical body 502. The ball pivot 120a can also include a mounting channel configured to receive a suspended cable. For example, FIG. 5 illustrates that the body 502 of the ball pivot 120a can include a mounting channel 504 extending axially therethrough. In other words, the mounting channel 504 can extend from one end of the ball pivot 120a, along the central axis of the ball pivot 120a, and out the opposing end of the ball pivot 120a. As explained above in relation to the ball pivot 120a, the positioning of the mounting channel 504 along the central axis of the ball pivot 120a can help ensure that the ball pivot 120a and any corresponding panels are balanced relative to the cable 102. This can help prevent various components of the ball pivot assembly 110 from contacting a panel at undesired orientations, digging into the panel, or otherwise damaging the panel.

The ball pivot 120a can also include a cable-grip mechanism for securing the ball pivot 120a to the cable 102, or in other words for securing the cable 102 within the mounting channel 504 of the ball pivot 120. For example, FIG. 5 illustrates that the ball pivot 120a can include a locking channel 508 and a fastener 508. In at least one implementation of the present invention, the fastener 510 can comprise a set screw. In use, a user can thread the fastener 510 within the locking channel 508 to lock the ball pivot 120a to the cable 102. In particular, the user can tighten the fastener 510 within the locking channel 508 until it rests or abuts against a cable 102 within the mounting slot 504.

Additionally, as shown in FIG. 5, the ball pivot 120a can include a slot 512 extending radially through a side of the ball pivot 120a into the mounting channel 504. One will appreciate that the slot 512 can allow a user to secure the ball pivot 120a to a cable 102 that has been secured between two mounting surfaces and thus has no loose or free end. Along similar lines, the slot 514 can allow a user to secure the ball pivot 120a intermittingly along a cable 102 which already has other ball pivot assemblies 110 secured thereto. This is in contrast to the ball pivot 120 described hereinabove that typically must be mounted a cable 102 by inserting a free end of the cable 102 axially through the mounting slot 304.

Although not depicted in the Figures, one will appreciate that the ball pivot 120a can be used with a socket 130 in a manner similar to that shown and described in relation to ball pivot 120. The ball pivot assemblies 110 described hereinabove each include the use of ball socket 130; however, the present invention is not so limited and alternative implementations may not include a ball socket 130. For example, FIG. 6 illustrates a panel 100 that has been secured to a cable 102 via a ball pivot assembly that does not include a ball socket 130.

Figure 6:
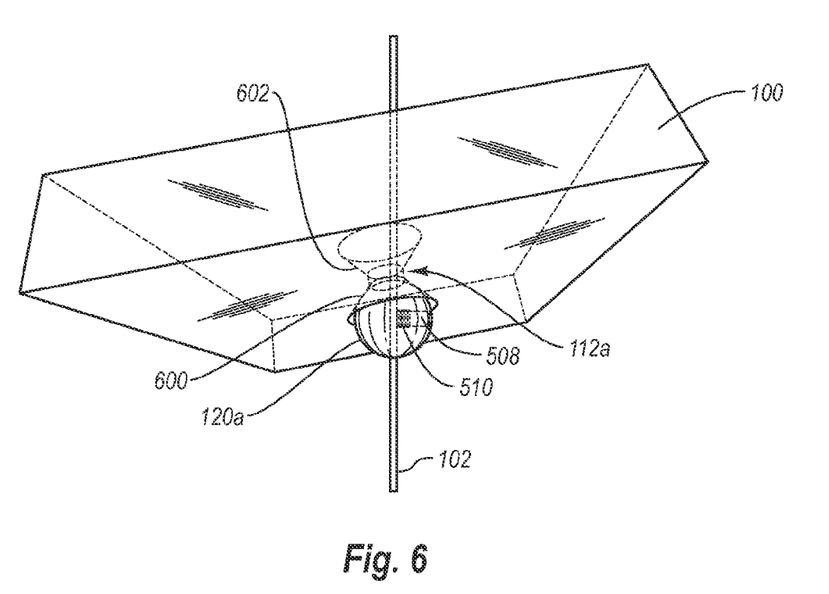
FIG. 6 illustrates a perspective-view of a panel mounted to a cable via the ball pivot of FIG. 5.

As shown in FIG. 6, the panel 100 can include a through-hole 112a that includes opposing conical bevels or countersunk recesses 600, 602. A user can size and configure one or more of the opposing countersunk recesses 600, 602 of the through-hole 112a to correspond to and fit over a ball pivot 120a. For example, FIG. 6 illustrates that countersunk recess 300 of the through-hole 112a allows the panel 100 to pivot on top of a ball pivot 120a. One will appreciate that the panel 100 can be pivoted and oriented on top of the ball pivot 120a almost regardless of geometry of the panel 100 or the angle or orientation of the panel 100 with respect to the cable 102. Furthermore, although FIG. 6 depicts the use of ball pivot 120a without a ball socket, one will appreciate in light of the disclosure herein that the ball pivot 120 shown and described in relation to FIGS. 1A-3 can similarly mount a panel 100 without a ball socket.

The corresponding curved geometries of the ball pivot 120a and the countersunk recess 600 of the through-hole 112a within which it is positioned can create a larger interface area between the panel 100 and ball pivot 120a than a planar interface would. This larger interface area and the contoured surface of the ball pivot 120a can help ensure that the stresses transferred to the panel 100 from the ball pivot 120a are spread evenly across an area of the panel 100. This can help avoid creating potentially damage causing point stresses in the panel 100.

Similar to the beveled surface 418 of the ball socket 130 (FIG. 4), the countersunk recess 602 formed in the back side of the panel 100 can provide sufficient space to allow the panel 100 to pivot and rotate about the ball pivot 120a. Additionally, the countersunk recess 602 of the through-hole 112a can provide sufficient space to help ensure that the panel 100 does not contact the cable 102. Thus, the countersunk recess 602 can help ensure that the cable 102 does not rest against or rub against the panel 100 or otherwise damage the panel 100.

Figure 7:
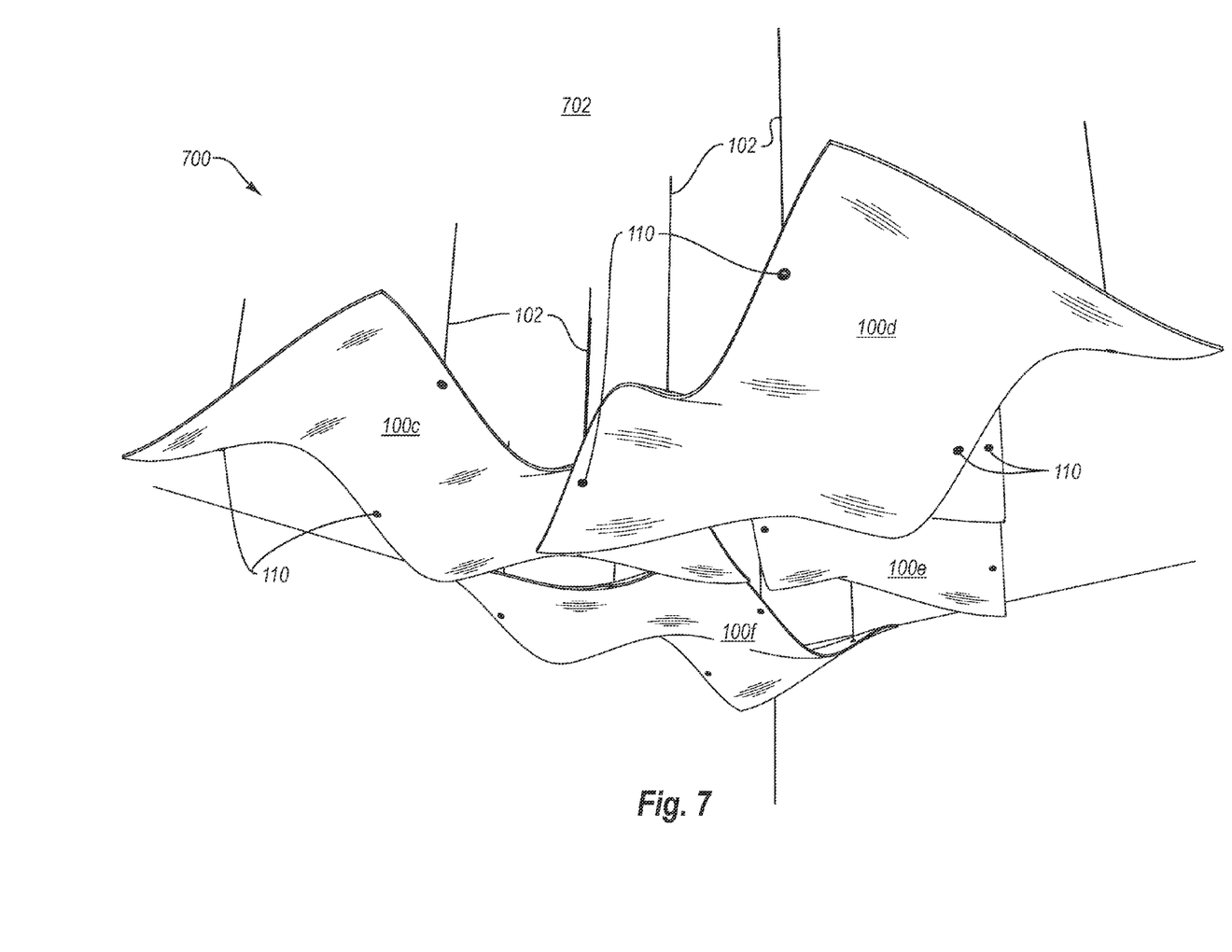
FIG. 7 illustrates a perspective view of a panel system including a plurality of panels mounted to cables suspended from a support surface via a plurality of ball pivot assemblies in accordance with one or more implementations of the present invention.

As mentioned previously, the one or more ball pivot assemblies of the present invention can securely mount curved or angled panels 100 to a support structure via one or more suspended cables without damaging the panels 100, while also providing a pleasing aesthetic. For example, FIG. 7 illustrates a perspective view of a schematic diagram of a system 700 comprising a plurality of panels 100c-f mounted as a treatment to a support structure 702 via a plurality of suspended cables 102. As shown, one or more ball pivot assemblies 110 secure each panel 100c-f of the plurality of panels to a respective cable 102. As discussed above, and as shown in FIG. 7, the ball pivot assemblies 110 can securely mount panels 100 to the cables 102 in a manner that allows for non-planar, curved panels, or panels oriented at any one of a plurality of angles relative to a support cable.

Furthermore, as shown in FIG. 7 each of the ball pivot assemblies 110 can be individually adjust to accommodate for the particular curvature or angle of the portion of the panel 100c-f which it supports. The individual adjustability and ability of each ball pivot assembly 110 to secure a panel having any number of different orientations and/or geometries can provide a user with great functional flexibility. Thus, one or more ball pivot assemblies of the present invention can allow a user to create any number of diverse and aesthetically pleasing panel system, such as the one depicted in FIG. 7.

For example, according to one or more implementations of the present invention, a single panel 100 can be mounted to four or more cables 102 using four or more ball pivot assemblies 110 as shown in FIG. 7. In the particularly illustrated implementation, the four cables 102 and ball pivot assemblies 110 can be located proximate the four corners of the panel 100. In this configuration, the four ball pivot assemblies 110 can allow a user to position or orient a panel at almost any angle relative to the four cables 102.

Additionally, although not depicted in the Figures, one will appreciate in light of the disclosure herein that multiple ball pivot assemblies 110 and multiple panels 100 can be suspended from a single set of cables 102. For example, a user can secure a plurality of panels 100 at different vertical positions along the four or more cables 102 to a desired aesthetic or to create shelving. Thus, one will appreciate that a user can create a wide variety of panel mounting systems using the various implementations of the ball pivot assemblies 110 disclosed herein.

Furthermore, the ball pivot assemblies 110 can also be used to create panel mounting systems that account for the one or more unique material properties of resin panels. For example, because resin panels are more flexible than many other traditional types of panels they tend to bow or deflect when extended across a long span. Furthermore, the smaller the gauge of panel, the greater tendency the panel will have to deflect. The present invention thus contemplates using one or more ball pivot assemblies along the length of longer panels to help ensure that the panels do not deflect across a long span. For instance, one or more ball pivot assemblies 110 of the present invention can be used to create shelving, wherein the pivot assemblies prevent the resin panel(s) of each shelf from deflecting along its length.

Implementations of the present invention also include methods of assembling and securing panels as a partition, display, treatment, barrier, or other structure to one or more cables. The following describes at least one implementation of a method of mounting panels 100 to cables 102 using ball pivot assemblies 110 as shown in FIGS. 1A-7. Of course, as a preliminary matter, one will recognize that the methods explained in detail can be modified in a wide variety of ways to assemble a wide variety of configurations using one or more components of the present invention. In particular, various acts of the method described below can be omitted or expanded, and the order of the various acts of the method described can be altered. Thus, one should view the following acts or steps as exemplary of one implementation of a method in accordance with the present invention.

For example, in at least one method of the present invention, a user can secure at least one panel 100 to a support structure via a suspended cable 102 using one or more ball pivot assemblies 110. Specifically, with reference to the components and diagrams of FIGS. 1A-7, a user can pass a cable 102 at least partially through a through-hole 112, 112a formed in a panel 100. For example, a user can secure a distal end of the cable 102 to a support surface 702. The user can insert a proximal end of the cable 102 at least partially through a through-hole 112, 112a within the panel 100 at a predetermined support location.

One will appreciate that the thinner the gauge of panel 100 used, the fewer the number of support locations needed to hold the weight of the panel 100; however, the greater the number of support locations needed to prevent deflection of the panel 100. On the other hand, the thicker the gauge of panel 100, the greater the number of support locations needed to hold the weight of the panel 100; but the lesser the number of support locations needed to prevent deflection of the panel 100. Furthermore, the number of support locations, and thus the number of ball pivot assemblies 110, needed may be dictated by the shape and desired orientation of the panel 100 and not the weight or deflection of the panel 100.

In any event, after passing the cable 102 at least partially within the through-hole 112, 112a of the panel 100, the user can insert the cable 102 within a mounting channel of a substantially spherical ball pivot. According to some implementations of the present invention, the user may insert the cable 102 into one end of the mounting channel 304, 504 pass the cable 102 axially through the body 302, 502 of the ball pivot 120, 120a, and out of an opposing end of the mounting channel 304, 504. Alternatively or additionally, the user can insert the cable 102 radially into the mounting channel 504 by inserting it within a slot 512 extending radially into the body 502 of the ball pivot 120a.

In any event, after having inserted the cable 102 within the mounting channel 304, 504 of the ball pivot 120, 120a, the user can then lock the ball pivot 120, 120a in place along the cable 102. In particular, the user can manipulate a cable-grip mechanism 306, 506 to lock the ball pivot 120, 120a with respect to the cable 102. For instance, the user can lock the ball pivot 120, 120a to the cable 102 by manipulating the cable-grip mechanism 306-506 so the cable 102 cannot move within the mounting channel 304, 504 in at least one direction. According to one or more implementations of the present invention the user can lock the ball pivot 120 in place along the cable 102 simply by positioning it within a spring-loaded cable-grip mechanism 306. In such implementations, a spring-loaded locking mechanism 306 can automatically prevent the movement of the cable 102 in at least one direction once the user inserts the cable 102 within a plunger 308 of the spring-loaded locking mechanism 306.

According to an alternative implementation of the present invention, the user can lock the ball pivot 120a in place along the cable 102 by tightening a fastener 510 of a cable-grip mechanism 506 within a locking channel 508 of the cable-grip mechanism 506. In such implementations, the user can tighten the fastener 510 with the locking channel 508 until it presses against the cable 102 within the mounting channel 504. One will appreciate that the fastener 510 can prevent the axial movement of the cable 102 in either direction within the mounting channel 504.

Additionally, some implementations of the present invention can include securing a plunger cap 318 to the ball pivot 120 to prevent an inadvertent releasing of the ball pivot 120 from the cable 120. In particular, the user can position the plunger 308 within the central channel 319 of the plunger cap 318, and then secure the plunger cap 318 to the plunger 308 via a fastener 320. One will appreciate that the plunger cap 318 can prevent the ball socket 130 or panel 100 from inadvertently depressing the plunger 308 and releasing the ball pivot 120 from the cable 102 during mounting. Furthermore, as an additional or alternative precaution the user can optionally ensure that at least a portion of the cable 102 extends beyond the bottom surface 316 of the ball pivot 120 to help prevent the ball pivot 120 from inadvertently being released from the cable 120.

The method can further include placing the ball pivot 120, 120a at least partially within the through-hole 112, 112a of the panel 100 whereby the ball pivot 120, 120a supports at least a portion of the weight of the panel 100. According to one or more implementations of the present invention, placing the ball pivot 120, 120a at least partially within the through-hole 112, 112a can include inserting a ball socket 130 within the through-hole 112, 112a, and then inserting the ball pivot 120, 120a within the ball socket 130. For example, the user can place the flange 408 of the ball socket 130 against a viewing surface 108 of the panel 100, and insert the body 400 of the ball socket 130 within the through-hole 112, 112a of the panel 100. The user can then position the ball pivot 120, 120a within an inner chamber 412 of the ball socket, and thus, within the through-hole 112, 112a of the panel 100.

According to alternative implementations of the present invention, the user can place the ball pivot 120, 120a directly into the through-hole 112a of the panel 100. For example, the user can position the ball pivot 120, 120a within a countersunk recess 600 of a through-hole 112a. In such implementations of the present invention, the countersunk recess 600 can have a contoured shape that to corresponds to the spherical shape of the ball pivot 120, 120a.

The method can further include pivoting the panel 100 about the ball pivot 120, 120a to position the panel 100 in a desired orientation. For example, the user can rotate, swivel, and pivot about the panel 100 (and the ball socket 130 in implementations incorporating such) about the ball pivot 120, 120a to adjust to the angle of the panel 100 relative to the cable 102 or to accommodate for various panel shapes and geometries. Furthermore, by pivoting the panel 100 (and in some implementations the ball socket 130) about the ball pivot 120, 120a the user can help ensure that the interface between the ball pivot 130 or countersunk recess 600 and the panel 100 reduces or prevents the likelihood of the hardware damaging the panel 100.

Finally, according to some implementations of the present invention, after securely mounting the panel 100 to the cable 102 via the ball pivot assembly 110, the user can cut the cable 102 so that it does not extend beyond the end of the ball pivot 120, 120a. One will appreciate in light of the disclosure herein that by cutting the cable 102, the user can further reduce the visibility of the hardware used to mount the panel 100. As mentioned previously however, according to some implementations of the present invention, the user may ensure that at least a small portion of the cable 102 extends beyond the ball pivot 120, 120a to help prevent the ball pivot 120, 120a from inadvertently slipping off of the cable 102 or being inadvertently released from the cable 102.

As the forgoing methods illustrate, systems and components of the present invention can provide a great deal of versatility in mounting panels. In particular, one or more of the systems and components of the present invention can enable panels to be secured to cables almost regardless of the geometry of the panel or the angle and orientation of the panel. Furthermore, various features and components of the present invention can allow a user to mount such panels without damaging the panel. This is possible at least in part since the one or more mounting systems of the present invention do not require complicated hardware and installation processes that lack the ability to account for the unique characteristics of resin panels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A panel mounting system, comprising:
   at least one cable configured to be secured to a support structure;
   at least one substantially spherical ball pivot having a mounting channel extending axially through the ball pivot, the mounting channel being configured to receive and secure the at least one cable therein to suspend the at least one ball pivot from the at least one cable;
   at least one unitary ball socket comprising:
      a body having a first terminal end, an opposing second terminal end, and a length extending therebetween, the body comprising an inner cylindrical chamber at least partially surrounding and directly contacting the at least one ball pivot such that the at least one unitary ball socket is supported by the at least one ball pivot, the first terminal end of the body defining a first terminal end of the inner cylindrical chamber, the inner cylindrical chamber comprising a seamless cylindrical surface of uniform diameter, and
      a flange extending radially outward from the first terminal end of the body, the flange including a front surface and a back surface; and
   a solid resin or glass panel having front display surface and an opposing rear surface, the panel further comprising a through-hole extending from the front display surface to the opposing rear surface;
   wherein:
      at least a portion of the body of the at least one ball socket is positioned within the through-hole of the panel,
      the front display surface of the panel is positioned against and supported by the back surface of the flange of the at least one ball socket,
      the at least one ball socket is configured to move relative to the at least one ball pivot to secure the panel in any of a plurality of different orientations relative to the at least one cable; and
      the front display surface of the panel is exposed and visible when the panel mounting system is suspended from the support structure.

2. The system as recited in claim 1, wherein the at least one ball pivot supports the weight of the panel.

3. The system as recited in claim 1, further comprising a washer positioned between the panel and the flange of the at least one ball socket.

4. The system as recited in claims 1, wherein the at least one ball socket comprises:
   a lip extending radially from the body partially into the inner chamber, the lip comprising a first surface oriented toward the inner cylindrical chamber, the first surface defining a second terminal end of the inner cylindrical chamber, and a second surface oriented away from the inner cylindrical chamber, the first surface of the lip being configured to prevent the at least one ball pivot from passing out of the inner chamber and through the second terminal end of the body.

5. The system as recited in claim 1, further comprising a cable-grip mechanism configured to secure the at least one ball pivot to the at least one cable.

6. The system as recited in claim 5, wherein the cable-grip mechanism comprises a spring-loaded cable-grip mechanism configured to allow the cable to pass through the mounting channel in a single direction when compressed, and to pass through the mounting channel in two directions when expanded.

7. A ball socket for use in securing a curved or angled panel to a suspended cable, comprising:
   a body having a first end, an opposing second end, and a length extending therebetween, the body including a seamless inner cylindrical surface extending from the first end toward the second end of the body, the inner cylindrical surface defining an inner chamber configured to at least partially surround a ball pivot;
   wherein the first end of the body is configured such that the at least one ball pivot can pass out of the inner chamber through the first end of the body;
   a flange extending radially outward directly from the first end of the body, the flange being configured to support a panel thereon;
   a lip extending radially from the body partially into the inner chamber, the lip being configured to prevent a ball pivot from passing out of the inner chamber through the second end of the body; and an o-ring surrounding at least a portion of an outer surface of the body, the o-ring being configured to prevent the panel from directly contacting the body irrespective of the orientation of the body.

8. The ball socket as recited in claim 7, further comprising a washer positioned around the outer surface of the body and against the flange.

9. The ball socket as recited in claim 8, further comprising a groove extending radially into at least a portion of the length of the body, the groove being configured to receive the o-ring.

10. A ball pivot assembly for securing a panel to a suspended cable, comprising:
   a substantially spherical ball pivot having a mounting channel extending axially through the ball pivot, the mounting channel being configured to allow a cable to pass there through;
   a seamless ball socket having an inner chamber configured to receive at least a portion of the ball pivot and allow the ball socket to pivot about the ball pivot between a plurality of orientations in a plurality of planes, the ball socket being configured such that the ball pivot can pass out of the inner chamber through a first end of the ball socket, the ball socket further including a flange extending radially outward from the first end of the ball socket, and a lip extending radially from a second end of the ball socket partially into the inner chamber, the lip being configured to prevent a ball pivot from passing out of the inner chamber and through a second end of the ball socket;
   an o-ring surrounding an outer surface of the ball socket, the o-ring being configured to prevent the panel from directly contacting the ball socket irrespective of the orientation of the ball socket; and
   a washer positioned about the outer surface of the ball socket and against a back surface of the flange, the washer being configured to rest against the panel and prevent the panel from directly contacting the ball socket.

11. The assembly as recited in claim 10, further comprising a cable configured to be suspended from a support structure.

12. The assembly as recited in claim 10, further comprising a cable-grip mechanism configured to secure a cable within the mounting channel.

13. The assembly as recited in claim 12, wherein said cable-grip mechanism comprises a spring-loaded plunger.

14. The assembly as recited in claim 13, further comprising a plunger cap configured to prevent the spring-loaded plunger from being depressed.

15. The system as recited in claim 1, wherein the panel is resin.

16. The system as recited in claim 15, wherein the panel is curved and non-planar.

17. The system as recited in claim 1, further comprising an o-ring surrounding at least a portion of an outer surface of the body of the at least one ball socket.

18. The system as recited in claims 6, further comprising a plunger cap configured to prevent the spring-loaded plunger from being depressed.

19. The system as recited in claim 1, wherein the inner chamber comprises a cylinder of uniform diameter.

20. The system as recited in claim 1, wherein the at least one ball socket is configured such that the at least one ball pivot can pass out of the inner chamber through the first terminal end of the body.

* * * * *